United States Patent [19]

Eickmeyer

[11] 4,271,132

[45] * Jun. 2, 1981

[54] METHOD AND COMPOSITIONS FOR REMOVING ACID GASES FROM GASEOUS MIXTURES

[76] Inventor: Allen G. Eickmeyer, 8126 El Monte, Prairie Village, Kans. 66208

[*] Notice: The portion of the term of this patent subsequent to Nov. 26, 1991, has been disclaimed.

[21] Appl. No.: 124,413

[22] Filed: Mar. 15, 1971

Related U.S. Application Data

[60] Division of Ser. No. 22,505, Mar. 25, 1970, abandoned, and a continuation-in-part of Ser. No. 432,334, Feb. 12, 1965, abandoned, which is a continuation-in-part of Ser. No. 291,532, Jun. 28, 1963, abandoned, which is a continuation-in-part of Ser. No. 231,963, Oct. 22, 1962, abandoned, which is a continuation-in-part of Ser. No. 209,221, Jul. 11, 1962, abandoned, said Ser. No. 22,505, is a continuation-in-part of Ser. No. 523,926, Feb. 1, 1966, abandoned.

[51] Int. Cl.³ .............................................. B01D 53/34
[52] U.S. Cl. ..................................... 423/223; 423/228; 423/229; 423/232
[58] Field of Search ............................... 423/226–229, 423/232, 233, 223

[56] References Cited

U.S. PATENT DOCUMENTS

| | | | |
|---|---|---|---|
| 1,964,808 | 7/1934 | Bottoms | 423/228 |
| 1,971,798 | 8/1934 | Shoeld | 423/223 |
| 2,083,213 | 6/1937 | Baehr et al. | 423/228 |
| 2,157,879 | 5/1939 | Zublin | 423/223 |
| 2,164,194 | 6/1939 | Millar et al. | 423/223 |
| 2,718,454 | 9/1955 | Wylie | 423/228 |
| 2,886,405 | 5/1959 | Benson et al. | 423/229 |
| 3,144,301 | 8/1964 | Mayland | 423/229 |
| 3,851,041 | 11/1974 | Eickmeyer | 423/232 |

FOREIGN PATENT DOCUMENTS

| | | | |
|---|---|---|---|
| 33238 | 3/1956 | Fed. Rep. of Germany | 423/232 |
| 1074201 | 1/1960 | Fed. Rep. of Germany | 423/232 |
| 450519 | 7/1936 | United Kingdom | 423/228 |
| 778404 | 1/1958 | United Kingdom | 423/229 |
| 1084526 | 9/1967 | United Kingdom . | |

OTHER PUBLICATIONS

American Chemical Society Monograph No.72, (1936), pp. 162–164.

Ellis, "Correlation of Absorption Rates of Carbon Dioxide by Alkaline and Amine Solutions in Packed Columns", Trans. Instn. Chem. Engrs., vol. 38, 1960, pp. 216–224.

*Primary Examiner*—Earl G. Thomas

[57] ABSTRACT

The invention relates to an absorption desorption composition and process employing said composition for selectively removing acidic gases, particularly carbon dioxide ($CO_2$) and hydrogen sulphide ($H_2S$) from gaseous mixtures, said composition comprising an aqueous solution containing a major proportion of alkali metal salts, potassium carbonate and potassium borate, a minor proportion of a catalytic activator, and a corrosion inhibitor when required, with provision for maintaining the inhibitor in an effective condition and in condition to perform its corrosion reducing function; the process characterized by two stages of absorption and desorption connected in a circulating system for the fluids being processed with suitable temperature and pressure controls, whereby an increased amount of the contaminating gases are removed and corrosive and side reaction difficulties reduced to a minimum.

7 Claims, 2 Drawing Figures

METHOD AND COMPOSITIONS FOR REMOVING ACID GASES FROM GASEOUS MIXTURES

BACKGROUND AND SUMMARY OF THE INVENTION

This application is a division of Ser. No. 22,505 which was filed Mar. 25, 1970, now abandoned, and which is a continuation-in-part of Ser. No. 523,926, filed Feb. 1, 1966, now abandoned. This application is also a continuation-in-part of a series of closely related applications including Ser. No. 432,334, filed Feb. 12, 1965, now abandoned, a continuation-in-part of Ser. No. 291,532, filed June 28, 1963, now abandoned, which in turn was a continuation-in-part of Ser. No. 231,963, filed Oct. 22, 1962, now abandoned, which in turn was a continuation-in-part of Ser. No. 209,221, filed July 11, 1962, now abandoned.

It has been known to treat gas mixtures with aqueous solutions of potassium carbonate for the separation of acid gases $CO_2$ and $H_2S$, in the purification of natural gas and hydrogen used for making ammonia. A solution containing 15% to 40% potassium carbonate is contacted with the mixed gas in an absorber tower equipped with bubble trays or packing where the acid gases are absorbed in the solution. The solution then enters a regenerator tower, in which the acid gases are removed from the solution by steam stripping. The regenerated solution is continuously recycled to the absorber. Normally in present conventional methods the absorption is performed under pressure using a hot solution, with little or no cooling after regeneration.

The hot potassium carbonate process above described does not require solution heat exchangers and coolers used with the familiar amine scrubbing process. However, in commercial practice, objections have been found to hot carbonate scrubbing. Carbon dioxide is absorbed and desorbed very slowly. This limits both plant capacity and purity of the scrubbed gas. In scrubbing natural gas containing both $CO_2$ and $H_2S$, the degree of removal of $H_2S$ is normally unsatisfactory for pipeline requirements and a subsequent purification system is needed. Regeneration of the solution is incomplete and potassium sulphide accumulates in the circulating solution. It is common practice to follow a hot potassium bulk removal system with amine scrubbing for better purification.

Some inorganic additives, such as arsenious anhydride ($As_2O_3$) and selenious and tellurous acid, proposed as solution activators, are not favored and are objectionable because of toxicity and undesirable side reactions. A number of organic additives proposed, such as protides and amino acids, have proven to be unstable under the process conditions.

Conventional amine systems frequently suffer from corrosion in removing high concentrations of $CO_2$ under pressure. When saturated with $CO_2$ at high partial pressures, the usual 10%-30% ethanolamine solutions undergo degrading side reactions with $CO_2$, thereby losing capacity to absorb acidic gases, and resulting in corrosive products, which are only removed from the system in a purification kettle where the volatile ethanolamine is recovered by distillation. The use of sodium vanadate, which has been proposed as a corrosion inhibitor for amine systems, is impractical because of its nonvolatility, since it is soon removed from the system during purification.

The towers and pipelines for such processing are generally constructed of carbon steel and an effective corrosion inhibition is necessary for a practical process. Potassium dichromate of 0.3% concentration has been found to inhibit corrosion in hot potassium carbonate systems, but it has the serious disadvatage of forming solids which deposit in the towers and on heat exchanger tubes, which require cleaning of the equipment, therefore, it is not a satisfactory inhibitor.

In early laboratory corrosion tests in which a relatively small iron surface area was contacted by a relatively large volume of hot potassium carbonate solution, the addition of 0.1% to 0.3% sodium metavanadate was found to inhibit corrosion without formation of solids. Likewise the equivalent amount of vanadium pentoxide $V_2O_5$ dissolved in potassium carbonate to give potassium metavanadate was also effective. However, in a commercial hot carbonate system used for removing $CO_2$ from hydrogen gas, I found that the addition of 0.2% to 0.3% potassium metavanadate was not effective. The metavanadate disappeared from the solution and rapid corrosion of steel equipment occurred. It was thus determined that the same inhibitor did not perform the same in plant operation as it did in the laboratory.

An object of this invention is to provide stable, non-poisonous catalysts and catalyzed potassium salt solutions for the absorption and desorption of acid gases.

Another object is to provide a method requiring fewer steps for purifying gas mixtures containing acid gases.

A further object is to provide a scrubbing method for gas purification wherein undesirable side reactions are negligible.

Still another object is to provide a solution from which absorbed hydrogen sulphide may be substantially completely regenerated.

An object pertaining to inhibiting corrosion is to maintain effective corrosion inhibition by contacting the solution with an oxidizing material.

Other and further objects of the invention, together with features of novelty appurtenant thereto, will appear in the course of the following description.

DESCRIPTION OF THE INVENTION

I have found that the rate of absorption of $CO_2$ in aqueous solutions of potassium carbonate, borate, phosphate and arsenite or mixtures thereof, is catalyzed by amines and amine-boron compounds.

Amines and their borates tested and found to be catalysts include ethylene polyamines and alkanolamines, such as ethanolamines and reaction products of ethylene oxide and ethylene polyamines. Examples are ethylenediamine, diethylenetriamine, triethylene-tetramine, tetraethylenepentamine, monoethanolamine, diethanolamine, triethanolamine, dihydroxyethyl ethylenediamine, trihydroxyethyl ethylenediamine, trihydroxyethyl diethylenetriamine, etc. When negligible vapor pressure is desired in a hot absorption system, polyhydroxyethylamines, such as the last five amines named above, are preferred. I may regenerate solutions, catalyzed by these amines, by means of open steam or gas stripping instead of reboiling. I have also found that other aliphatic amines function as catalysts for potassium carbonate or borate solutions, but selection of a suitable catalyst is governed somewhat by its corrosive properites.

I have found that $CO_2$ absorbs at the same slow rate in potassium borate as in potassium carbonate. Therefore, I was surprised to find a very strong catalytic effect on carbonate solutions resulting from the addition of one or more of the reaction products of an alkanolamine and boric acid or potassium borate. The chemical structure of the reaction product is uncertain. Boric acid may react with hydroxy groups to give an ester, or with amino groups to give an amine borate, or both reactions may occur. Herein, these products are called "amine borates."

Solutions of amines and amine borates are known alkaline absorbents for $CO_2$. However my experiments showed that small amounts of amines and amine borates are more effective as catalysts in potassium solutions. With an amine borate supplying only 10%–15% of the total alkalinity of my catalyzed potassium carbonate or borate solution, $CO_2$ is absorbed rapidly, not only at the start but through the entire range of capacity until the solution becomes saturated with $CO_2$. Also, throughout regeneration, desorption is rapid.

Although other potassium salts of weak acids may be used, potassium carbonate, potassium borate and their mixtures are preferred as the primary alkaline component of my catalyzed solutions. Catalyzed solutions of sodium salts are not the equivalent to potassium in $CO_2$ absorption rate nor capacity.

It is known that, upon absorption, $CO_2$ reacts with water and converts potassium carbonate to potassium bicarbonate in accordance with the following reactions:

$$CO_2 + H_2O = H_2CO_3$$

$$H_2CO_3 + K_2CO_3 = 2KHCO_3$$

The rate limiting step is the hydration of $CO_2$ and the catalyst facilitates this reaction. An amine borate used alone has some capacity to absorb $CO_2$. However, tests with catalyzed potassium solution have proved that the absorption is not preferential; instead the absorption is catalyzed throughout the entire conversion range of potassium carbonate. Thus the mechanism appears to be transfer catalysis on the part of $CO_2$ or water or both.

The preferred composition of my catalyzed solution is dependent upon the composition of the gas to be treated, the gas purity desired, and the temperature and pressure of absorption. The solubility of potassium bicarbonate and/or borate places a practical limit on the maximum potassium solution strength. In general, I start with at least 10% by weight of potassium carbonate, metaborate or hydroxide, (or mixture), in aqueous solution, and I prefer to use between 15% and 40% of the potassium compound. Because of the variation of equivalent weight of amines, it is convenient to speak in terms of atomic ratios of amino nitrogen, potassium and boron. On this basis, I prefer to use potassium to amine ratios within the range of 100:1 and 2:1, although I may use higher or lower ratios, such as 1:1, in which case 50% of the total alkalinity is supplied by the potassium and 50% by the amine. When $CO_2$ is the only acid gas to be absorbed, I prefer to use boron to amine ratios of about 1:1 to 2:1, although higher or lower ratios may be used. When $H_2S$ is to be removed, I prefer to use a boron to potassium ratio between 0.4:1 and 1.4:1 and a boron to amine ratio between 1:1 and 3:1. I find thereby great improvement in the elimination of $H_2S$ from the regenrated solution and from the treated gas.

In order to determine the catalytic effect of the compositions of my invention, the reaction kinetics of $CO_2$ absorption were measured with various solutions under identical conditions of atmospheric pressure and temperatures of 56° C. and 80° C. according to the tables which follow. Amine borates contribute to the alkalinity as well as potassium, and the total alkalinity was held constant at about 2.5 normal for the runs in Table 1 and about 4.5 normal for the runs in Tables 2 and 3. At each value for total alkalinity, the relative $CO_2$ absorption rates are shown with respect to plain potassium carbonate. Since 15% $K_2CO_3$ absorbed at a faster rate than 25% $K_2CO_3$, (each without additives), the relative $CO_2$ absorption rates of Table 1 are not directly comparable with those of Tables 2 and 3. In order to distinguish readily between runs of different total alkalinity, in the atomic B:K:N ratios, potassium (or sodium) was arbitrarily assigned a value of 6 for 2.5 normal solutions and 10 for 4.5 normal solutions.

The data of Table 1 shows that my catalyzed solutions of preferred compositions absorb $CO_2$ more rapidly than solution of any component alone. Compared with dilute solutions, I found that solutions of higher concentration, having less water, absorb $CO_2$ more slowly. Therefore they respond more dramatically to catalysts, as shown by a comparison of Table 2 with Table 1.

TABLE 1

| Runs with 2.5 normal total alkalinity | | |
|---|---|---|
| B:K:N Ratio | Amine Reacted | Relative $CO_2$ Absorption Rate |
| 0:6:0 (15% $K_2CO_3$) | None | 1.0 |
| 6:6:0 ($KBO_2$) | None | 1.2 |
| 0:6:0 ($K_3PO_4$) | None | 0.9 |
| 6:0:6 (DEA Meta borate) | DEA | 2.8 |
| 0.5:6:0.25 | DEA | 2.4 |
| 1:6:0.5 | DEA | 3.2 |
| 2:6:1 | DEA | 4.1 |
| 1:6:1 | DEA | 3.8 |
| 3:6:3 | DEA | 4.0 |
| 6:6:3 | DEA | 3.3 |
| 3:6:1 | DEA | 3.5 |
| 2:6:1 | MEA | 3.5 |
| 2:6:1 | TEA | 1.9 |
| 1:6:1 | EDA | 2.8 |
| 2:6:1 | TETA-EO | 4.4 |
| 2:6:1 (Starting with $K_3PO_4$) | DEA | 1.8 |
| B:Na:N Ratio | | |
| 1:6:1 (Starting with $Na_2CO_3$) | DEA | 2.2 |

Note: DEA is diethanolamine, MEA is monoethanolamine, TEA is triethanolamine, EDA is ethylenediamine, and TETA-EO is the reaction product of triethylenetetramine and ethylene oxide.

TABLE 2

| Runs with 4.5 normal total alkalinity: | | |
|---|---|---|
| B:K:N Ratio | Amine Reacted | Relative $CO_2$ Absorption Rate |
| 0:10:0 (25% $K_2CO_3$) | None | 1.0 |
| 1:10:1 | DEA | 4.3 |
| 2:10:2 | DEA | 6.9 |

TABLE 3

Runs starting with 4.5 normal solution from an operating hot carbonate plant. (Solution was cloudy and contained dissolved and suspended foreign material.)

| B:K:N Ratio | Amine Reacted | Relative $CO_2$ Absorption Rate (compared with 25% $K_2CO_3$ in Table 2) |
| --- | --- | --- |
| 0:10:0 (25% $K_2CO_3$ solution) | None | 0.7 |
| 1:10:1 | DEA | 3.1 |
| 2:10:2 | DEA | 4.9 |
| 4:10:2 | DEA | 4.5 |

My catalysts permit the use of solutions of higher strength and acid gas capacity than solutions commonly employed in hot carbonate systems. This, and more complete regeneration, results in a substantial reduction in solution circulation rate, increased capacity of an existing plant or smaller equipment for a new plant, reduction in heat for regeneration, and improved gas purification. In many cases, the improved purification eliminates the need for a second scrubbing system, such as the familiar monoethanolamine scrubbing following hot carbonate scrubbing.

My catalyzed solutions are characterized by the low heat of absorption of a potassium carbonate solution and the high activity of an amine solution without the familiar disadvantages of concentrated amine solutions, which suffer from side reactions and corrosiveness and require continual purificaton by distillation. By exhaustive experimental testing I have found that, in removing $CO_2$ from a gas containing no $H_2S$, corrosion of carbon steel by my catalyzed solutions can be inhibited by 1000–5000 PPM, or more or less (as $V_2O_5$ equivalent), of an alkali metal vanadate or peroxyvanadate, with insignificant losses of inhibitor when treated with an oxidizing agent as hereinafter described. My preferred catalyzed solutions include a small amount of potassium vanadate or peroxyvanadate except when the gas being scrubbed contains $H_2S$. Also I have found it possible to dissolve 1.0%–5.0% of the vanadium inhibitor, expressed as $V_2O_5$ equivalent, in a concentrated (50%–80%) amine borate solution, a viscous concentrate which may be conveniently shipped and added to a potassium salt solution to activate the solution and simultaneously to protect the equipment from corrosion. Potassium dichromte, which is commonly used in hot potassium carbonate systems, is not compatible with my catalyst because of an oxidation reduction reaction which destroys both the inhibitor and the amine compound.

Furthermore my catalysts may be used to improve upon or to replace other potassium solution catalysts, such as arsenic trioxide, which is highly poisonous. When I added 140 grams of arsenic trioxide per liter of 4.5 normal $K_2CO_3$ solution it was converted to potassium ortho-arsenite. The relative $CO_2$ absorption rate at 80° C. was found to be 3.6 times as fast as the original potassium carbonate solution. Comparison with Table 2 shows my catalyzed solutions are more active than this. After adding my diethanolamine borate catalyst to the arsenite solution to obtain a B:K:N ratio of 1.2: 10: 1.2, I found that the relative $CO_2$ absorption rate had increased to 5.2, which was a 45% improvement. As a result of these tests, I anticipate the use of amine borate catalysts to improve the purification of gases with arsenite solutions and eventually the replacement of arsenic trioxide as an additive to potassium salt scrubbing solutions.

While my catalyzed solutions improve the degree of purification of the scrubbed gas in systems having a single stage of absorption and regeneration, for those instances where better purification is required, such as 0.03%–0.5% $CO_2$ or 0–4 PPM $H_2S$ by volume, I use a single solution in a two-stage system.

Figure 1:
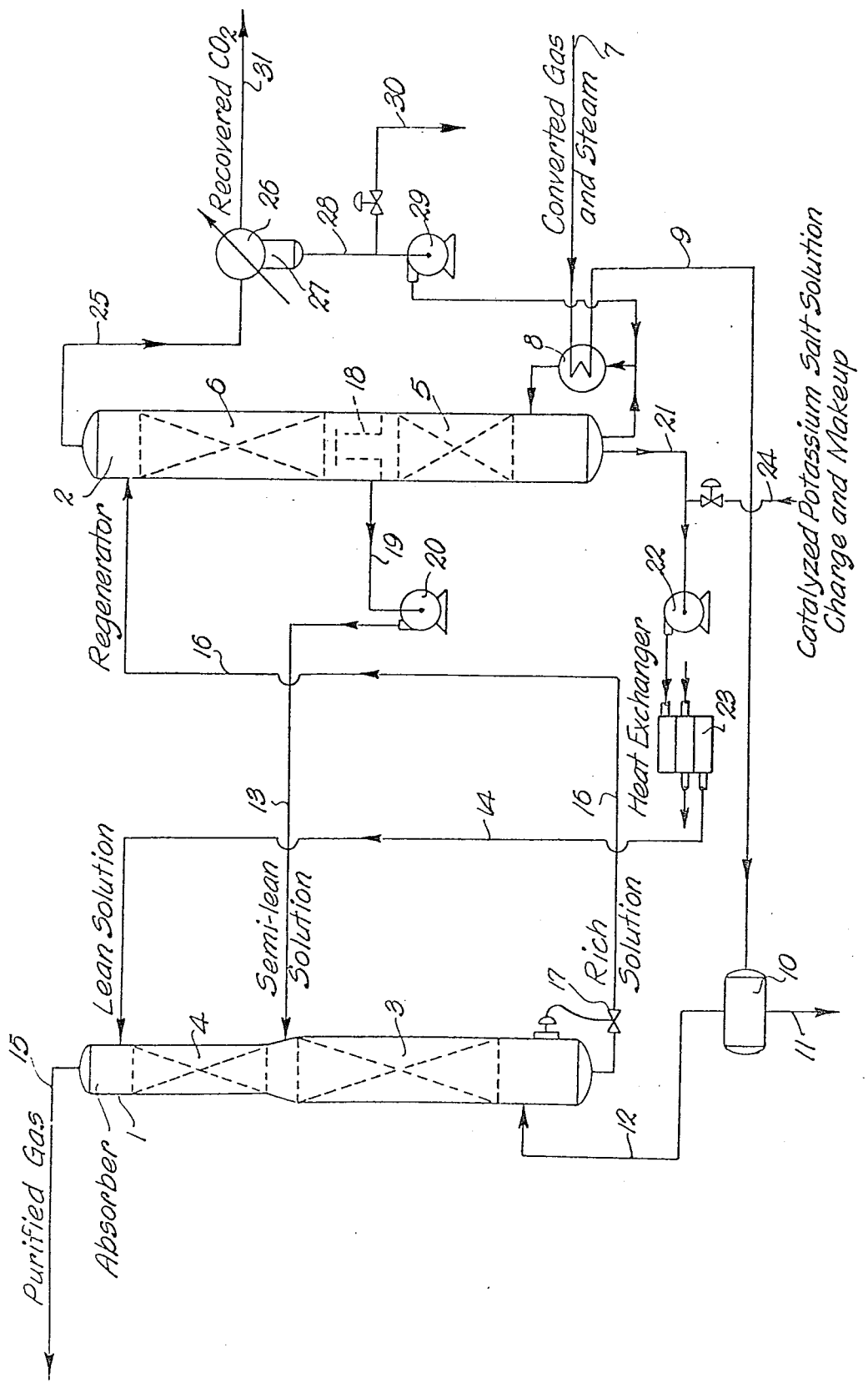
FIG. 1 is a flow diagram of a preferred embodiment of a method for purifying gases available hot, such as manufactured hydrogen or ammonia synthesis gas and similar gases containing 15% to 35% $CO_2$.

Referring to the drawings, the scrubbing system shown in FIG. 1 includes an absorber 1 and regenerator 2. In absorber 1 are two absorption zones 3 and 4, equipped with packing or bubble trays; and two regeneration zones 5 and 6, also equipped with packing or bubble trays in regenerator 2.

Converted gas containing $CO_2$ usually available from a shift converter of an ammonia plant at elevated temperature and pressure and mixed with steam is charged through line 7 to reboiler 8 wherein process waste heat is recovered by condensing most of the steam and boiling the solution being regenerated. Alternatively the reboiler 8 may be heated by low pressure steam. From the reboiler the gas-steam-condensate mixture passes through line 9 to separator 10 from which condensate is discharged through pipe 11 and the gas-steam mixture through line 12. Usually the gas-steam mixture is discharged at temperature between 240° F. and 280° F. but these temperatures vary according to existing conditions. Stream 12 enters absorber directly as shown or, if desired to recover more waste heat, it may be cooled further by heat exchange, not shown, before entering the absorber.

The converted gas passes upward through the absorber first contacting in zone 3 a relatively large amount of semi-lean catalyzed potassium salt solution, above mentioned, which enters the absorber at an intermediate point through line 13, substantially at the temperature of regeneration. In zone 3 most of the $CO_2$ is absorbed by the solution so gas leaving zone 3 under normal operations contains between 0.3% and 2% $CO_2$. In zone 4 the gas contacts a relatively small amount of lean catalyzed potassium salt solution, entering the top of the absorber through pipe 14, which removes the remaining $CO_2$ to the desired level, usually between 0.03% and 0.3% $CO_2$. The purified gas leaves the absorber through pipe 15.

The lean solution, having absorbed some $CO_2$ in zone 4, mixes with the semilean solution introduced through pipe 13 passing down through zone 3 and absorbing more $CO_2$ to become a rich solution, which is withdrawn from absorber 1, through line 16 regulated by level control valve 17. The rich solution is directed through line 16 to regenerator 2 where it passes downwardly through regeneration zone 6 countercurrent to a rising current of steam which causes desorption of much of the $CO_2$ resulting in a semilean solution which collects on chimney tray 18 located at an intermediate point of the regenerator. A portion of this solution is withdrawn through line 19 to be recirculated by pump 20 and pipe 13 to an intermediate point of the absorber 1. A small part of the semilean solution overflows through holes in the chimney tray to flow downwardly through regeneration zone 5. In zone 5 the solution is contacted with a relatively large amount of steam passing upwardly in the zone which thoroughly regenerates the solution to a lean condition. The lean solution collecting in the bottom of the regenerator circulates through reboiler 8 and is drawn off through pipe 21 to be recirculated by pump 22 through line 14 to the top of absorber 1. Depending upon the degree of purification and the temperature for the purified gas, the lean solution may be cooled by interposing heat exchanger 23 in line 14 or it may be returned to the absorber at the temperature of regeneration. If the purified gas is to be cooled to ambient temperature, I usually prefer to split the lean solution leaving pump 22 into two streams, one stream being cooled to ambient temperature and sent to the top of the absorber as shown, and an uncooled stream, not shown, which is sent to an intermediate point of absorption zone 4. In this fashion, the lower part of zone 4 is kept hotter, considerbly increasing the rate of absorption in the zone.

The initial charge of catalyzed potassium salt solution and such make-up is necessary to the system compensating for losses is introduced through line 24.

A mixture of steam and $CO_2$ leaves the top of the regenerator 2 through line 25 through which it is directed to condenser 26 where the steam is condensed collected in sump 27. This condensate is returned through pipe 28 and pump 29 to the reboiler 8 or other suitable point in the system. Excess condensate is removed through line 30. The recovered $CO_2$ is withdrawn from condenser 26 through line 31 and may be compressed for processing into urea or dry ice, in which case it is preferable to hold 5 to 10 pounds per square inch back pressure on the regenerator to reduce the power requied for compression.

The method depicted by the flow diagram of FIG. 1 is commonly referred to as a two-stage system having reference to the two absorption zones and the two regeneration zones. Such two-stage systems have been used with ordinary potassium carbonate solution without a catalyst and with the total solution being split into ⅓ lean solution and ⅔ semilean solution. It has been discovered that, when catalyzed solutions are used, the $CO_2$ content of the gas leaving zone 3 is much reduced and the lean solution introduced into the top of zone 4 may be much less than 20% of the total, preferably within a range of 4% to 20% and the semilean solution within a range of 80% to 96% of the total solution circulated. Also it has been found that recirculating a relatively small stream of solution to regeneration zone 5 (rather than the ⅓ proportion used in the prior art) results in a much more thoroughly regenerated lean solution, capable of better purification of the gas in the absorber zone 4. The varying of the porportions of lean and semilean solutions to achieve novel proportions directed to the zones of both the absorber and regenerator of a two-stage system regardless of the activated or catalyzed solutions employed constitutes an important concept of the instant invention.

In the event that the incoming gas to be purified in line 7 or 12 is at ambient temperature, as in the case of sour natural gas, the reboiler 8 may be heated by steam or direct firing. Such cold gas may be preheated before entering the absorber by heat exchange (not shown) with hot lean solution, returned through lines 21 and 14, thereby partially cooling the lean solution and reducing the cooling load on cooler 23. Also I may divide the incoming cold gas into two streams and heat exchange one stream of gas with the hot lean solution returned through lines 21 and 14, as described, and the other stream of gas with the semilean solution recycled through line 13. As a result of these alterations, the rich solution leaving the absorber is hotter and requires less heat for regneration.

The scrubbing method is not limited with respect to absorption and regeneration temperatures and pressures except by practical considerations of available materials of construction and their corrosion resisting properties.

EXAMPLES

Figure 2:
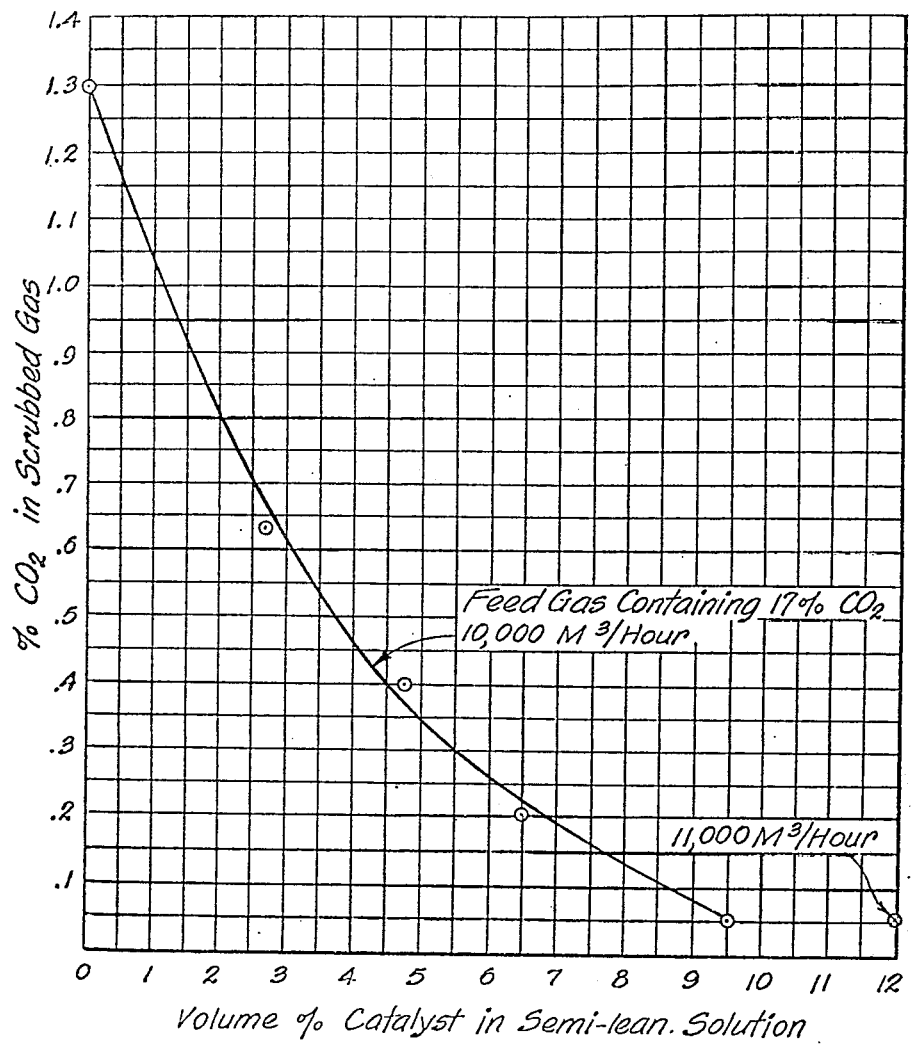
FIG. 2 is a chart showing the effect upon the percentage of $CO_2$ in a scrubbed gas by increasing amounts of catalyst in a potassium carbonate solution when employing a method according to FIG. 1.

FIG. 2 shows the result of adding increasing amounts of an amine borate catalyst to an aqueous potassium carbonate solution employed in an ammonia plant scrubbing system such as that shown in FIG. 1 except that the reboiler was heated by steam and the gas was at ambient temperature entering the absorber. Feed gas with 17% $CO_2$ entered at 21 Kg/cm² (kilograms per square centimeter) gauge pressure. During the plant tests the total alkalinity of the semilean solution was 3-4 normal (gram equivalents per liter). The lean solution circulation rate was 6% to 8% and the semilean solution 92% to 94% of the total solution circulation. The catalyst was a concentrated diethanolamine borate solution having an alkalinity of 5 normal so that after the final addition, at 12% by volume, the catalyst represented only 15% of the total alkalinity of the solution. Before adding the catalyst, while using 6,700 kg/hour of steam, the gas rate was raised to 9,600 M³/hour and the $CO_2$ content of the scrubbed gas rose to 1.3% which overloaded the copper liquor scrubbing system which followed. When the laboratory sounded an alarm of bad gas the first portion of catalyst was added and $CO_2$ content dropped promptly to half as much. The steam was then reduced to 6,100 Kg/hour and the gas rate adjusted to 10,000 M³/hour for further additions of catalyst. As shown by FIG. 2, with 9.5% catalyst the $CO_2$ content of the purified gas dropped to 0.06%. After the final addition of catalyst 0.06% $CO_2$ was obtained even with a gas rate of 11,000 M³/hour and, when the steam was increased to 7,200 Kg/hour, the $CO_2$ content dropped as low as 0.02%.

A two-stage plant using a hot potassium carbonate solution to scrub sour natural gas containing approximately 2% $H_2S$ and 7% $CO_2$ produced a scrubbed gas containing over 3 grains of $H_2S$ per 100 cubic feet (48 PPM) which exceeded the sales gas specification. The lean solution contained 750 grains of $H_2S$ per gallon, an excessive amount. When diethanolamine borate having 2:1 ratio of boron to nitrogen was added to the solution to obtain a 1:1 ratio of boron to potassium, the grains of $H_2S$ per gallon of lean solution dropped to less than 200 and the scrubbed gas became sweet, having 0.25 grains of $H_2S$ per 100 cubic feet. After a heat exchanger was connected to preheat the sour feed gas before entering the absorber by heat exchange with the hot lean solution leaving the generator, sweet gas was still obtained with 12% less heat being used to regenerate the solution.

The chemical and thermal stability of the amine borate catalyst was proved by tests of long duration in a scrubbing system of another ammonia plant. During the first week after adding catalyst, tests were run under prescribed conditions. During the next four months only nominal losses of the catalyst occurred and these losses were found to be in proportion to the potassium carbonate losses. After seven months of operation under different conditions it was convenient to check the performance of the systems under original prescribed conditions. A duplication of the original results provided that there was no significant detrimental change of the solution properties and that the catalyst had remained active. In the meantime it was not necessary to purify the solution in any way.

CORROSION INHIBITION

With respect to maintaining effective corrosion inhibition when removing $CO_2$ from a gas containing neither oxygen nor $H_2S$ it has been found possible to accomplish this result satisfactorily by contacting a vandate inhibited solution with a small amount of oxygen or an oxygen-containing gas, such as air, or by use of the oxidizing compositions hereinafter described. When purifying a gas containing $H_2S$, neither vanadate nor oxygen should be used since undesirable side reactions would occur. However, $H_2S$ itself dissolved in solution serves to inhibit corrosion of steel surfaces.

In a series of laboratory corrosion tests under uniform conditions, $CO_2$ containing no oxygen nor $H_2S$ was bubbled through hot solutions of potassium carbonate and of potassium borate in contact with a relatively large iron surface area and the solution was then analyzed for iron content as a measure of the relative corrosion rate. In the tests of Tables 4 and 5 in all cases an aqueous solution was used containing 25% $K_2CO_3$ and 0.2% $KVO_3$. In some cases, as shown in Table 4, a small amount of an oxidizing agent was added or air was bubbled through the solution. The results are summarized in Table 4.

TABLE 4

Corrosion tests with 25% $K_2CO_3$ and 0.2% $KVO_3$ in water

| TEST No. | 1 | 2 | 3 | 4 | 5 | 6 |
|---|---|---|---|---|---|---|
| Oxidizing Agent | None | .2% $H_2O_2$ | .02% $H_2O_2$ | .03% $K_2Cr_2O_7$ | Air | Air |
| Air bubbling time | None | None | None | None | 40 min. | 12 hrs. |
| Iron content, mg/liter | 563 | 1.7 | 8.7 | 10.8 | 140 | 20.7 |

In Test 1 of Table 4 it was found that the vanadate had disappeared, having becoming reduced to a lower state of oxidation, and rapid corrosion of the iron occurred as shown by the high concentration of iron in solution. Tests 2 and 3 of Table 4 showed that potassium peroxyvanadate, which was formed by reaction of the vanadate with hydrogen peroxide, provided excellent corrosion inhibition even when present in small amounts. In Test 3, Table 4, the amount of hydrogen peroxide was enough to give about 0.08% potassium peroxyvanadate. In Test 4, Table 4, a very small amount of another oxidizing agent, potassium dichromate, was used. The concentration of dichromate was only one tenth of the usual concentration employed when dichromate alone is used as an inhibitor.

Tests 5 and 6, Table 4, show that where adequate contact with air, which contains 20.9% oxygen, is added in amounts sufficient to avoid the reduction of the vanadate, good corrosion inhibition can be obtained.

Another series of laboratory corrosion tests were made under similar conditions and with similar compositions except that 10% diethanolamine borate was also present in the potassium carbonate solution. The results, given in Table 5, show a similar beneficial effect of the oxidizing agents on the vanadate in preventing corrosion, even in the presence of an ethanolamine.

TABLE 5

Corrosion tests with 25% $K_2CO_3$, 10% diethanolamine borate and 0.2% $KVO_3$ in water.

| TEST No. | 7 | 8 | 9 |
|---|---|---|---|
| Oxidizing agent | None | .04% $H_2O_2$ | .03% $K_2Cr_2O_7$ |
| Iron content | 119 | 16.9 | 17.1 |

In another series of corrosion tests under similar conditions except a more active iron surface was used which made the tests more sensitive, mixtures, of potassium carbonate solution with monoethanolamine (MEA) and with diethanolamine (DEA) including potassium metavanadate were tested and also solutions of potassium metaborate without vanadate. All solutions were 4.5 normal in potassium, which is equivalent to 25% $K_2CO_3$. Carbon dioxide was bubbled through the hot solutions both without and with simultaneous air bubbling. As shown in Table 6, in all cases, contact with air proved to be beneficial in inhibiting corrosion even without the presence of vanadate and even in the presence of ethanolamines.

TABLE 6

| TEST No. | 10 | 11 | 12 | 13 |
|---|---|---|---|---|
| Potassium salt | Carbonate | Carbonate | Carbonate | Carbonate |
| $KVO_3$ | 0.5% | 0.5% | 0.5% | 0.5% |
| Amine | 6% MEA | 6% MEA | 10% DEA | 10% DEA |
| Air bubbling | No | Yes | No | Yes |
| Iron content, mg/liter | 960 | 74 | 1056 | 296 |

| TEST No. | 14 | 15 | 16 | 17 |
|---|---|---|---|---|
| Potassium salt | Metaborate | Metaborate | Metaborate | Metaborate |
| $KVO_3$ | None | None | None | None |
| Amine | None | None | 10% DEA | 10% DEA |
| Air bubbling | No | Yes | No | Yes |
| Iron content mg/liter | 89 | 9 | 87 | 53 |

These laboratory tests indicated that slight oxidation of iron at the surface of steel equipment is essential to the formation and maintenance of a corrosion inhibiting film in systems removing $CO_2$ from a gas having no oxygen nor hydrogen sulphide.

It is to be understood that smaller or larger amounts of the metal salt inhibitors may be used. Depending on the severity of the corrosive conditions, usually between 0.05% and 2% of sodium, potassium or ammonium metavanadate or peroxyvanadate is used. Also the vanadate may be formed by dissolving the equivalent amount of vanadium pentoxide $V_2O_5$ in an alkaline solution.

The oxidizing agent may be added separately, either continuously or intermittently, but when added intermittently a more careful check must be kept on corrosion and the rate of reduction of vanadate. Also, since the vanadate acts as a carrier for oxygen, the oxidizing agent may be added at any suitable point in the circulating system. For reasons of convenience and safety, I prefer to inject an oxygen containing gas, such as air, into the pipeline carrying the rich solution to the top of the regenerator tower (line 16 of FIG. 1) or into the line carrying the stripping steam entering the bottom of the regenerator tower (the line leaving the reboiler 8 of FIG. 1). However, air may be injected at some other point in the system or a portion of the circulating solution may be contacted with air and returned to the system. If a solution of hydrogen peroxide is used, it is preferably diluted by mixing with the reflux condensate being returned to the system.

EXAMPLE

During the initial operation of a hot potassium carbonate system removing $CO_2$ from an oxygen-free gas mixture in an actual commercial ammonia plant, the iron content of the solution was determined frequently as an indication of any corrosion. At the start the solution contained about 22% $K_2CO_3$ and 0.2–0.3% $KVO_3$ potassium metavanadate. During the first five days in operation, without the addition of air, the iron content increased rapidly to 200 milligrams per liter. Also it was found that 53% of the original vanadate had become reduced to a lower state of oxidation. The plant was shut down and repairs were made at points of corrosion in the pipelines. During this time the solution was filtered to remove the iron compound which had precipitated when the solution had cooled. Upon resuming operations air at the rate of eight cubic feet per minute was injected near ground level into the rich solution line going to the top of the regenerator tower. During the next ten days, the iron content of the solution remained essentially constant at between 50 and 60 milligrams per liter, thus indicating that the corrosion had been arrested. Also only 11% of the original vanadate was reduced and 89% was present as vanadate. At this time 48,000 cubic feet per minute of hydrogen plus nitrogen was being purified. On the basis of the purified gas, the oxygen contained in the injected air amounted to 35 parts per million by volume.

In order to keep the solution in an optimum condition wherein the vanadium salt is properly oxidized rather than deterlorated to a reduced condition, sufficient air or other oxidizing material is added to maintain the inhibitor in an effective condition. The amount of air necessary will vary with plant conditions, including temperature of solution, amount of steel surface contacted by the solution, and the point of air injection which will determine the time and pressure of contact.

From the foregoing it will be seen that this invention is one well adapted to attain all of the ends and objects hereinabove set forth, together with other advantages which are obvious and which are inherent thereto.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described my invention, I claim:

1. An absorption-desorption process for removing acid gases such as $CO_2$ or $H_2S$ from gaseous mixture containing such acid gases, comprising the step of:

contacting said gaseous mixture with a hot aqueous solution comprising from about 15 to 40% by weight of a potassium salt selected from the group consisting of potassium carbonate, potassium borate and mixtures thereof and a minor amount of an amine selected from the group consisting of the alkanolamines and the ethylene polyamines in an absorption stage to thereby catalyze the absorption of said acid gases from said gaseous mixture;

maintaining the aqueous solution at an elevated temperature of at least about 56° C. during contact with said gaseous mixture;

regenerating the hot aqueous solution containing said absorbed acid gas in a regeneration stage by steam stripping at least a portion of said acid gas therefrom; and recycling at least a portion of said regenerated solution for further contact with said gaseous mixture while maintaining said solution at a temperature of at least 56° C.

2. The process of claim 1 wherein said alkanolamine is diethanolamine.

3. The process of claim 1 wherein said aqueous solution is contacted with said gaseous mixture in a two-stage absorber.

4. The process of claim 3 wherein said aqueous solution containing absorbed acid gas is regenerated in a twostage regenerator.

5. The process of claim 4 wherein the regenerated solution from the first stage of the regenerator is recycled to the first stage of the absorber and the regenerated solution from the second stage of the regenerator is recycled to the second stage of the absorber.

6. The process of claim 5 wherein the regenerated solution from the first stage of the regenerator is between about 80% and about 96%, by weight, of the total solution regenerated.

7. The process of claim 1 wherein said ethylene polyamine is ethylenediamine.

* * * * *